United States Patent
Zander et al.

(10) Patent No.: US 11,411,617 B2
(45) Date of Patent: Aug. 9, 2022

(54) METHODS AND DEVICES FOR POLARIZATION OPTIMIZATION OF MIMO WIRELESS TRANSMISSION

(71) Applicant: Sony Group Corporation, Tokyo (JP)

(72) Inventors: Olof Zander, Södra Sandby (SE); Fredrik Rusek, Eslöv (SE); Erik Bengtsson, Eslöv (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/053,032

(22) PCT Filed: Apr. 29, 2019

(86) PCT No.: PCT/EP2019/060959
§ 371 (c)(1),
(2) Date: Nov. 4, 2020

(87) PCT Pub. No.: WO2019/214985
PCT Pub. Date: Nov. 14, 2019

(65) Prior Publication Data
US 2021/0234578 A1 Jul. 29, 2021

(30) Foreign Application Priority Data
May 9, 2018 (SE) .................. 1830154-9

(51) Int. Cl.
*H04B 7/10* (2017.01)
*H04B 7/0417* (2017.01)

(52) U.S. Cl.
CPC ............ *H04B 7/0417* (2013.01); *H04B 7/10* (2013.01)

(58) Field of Classification Search
CPC ............................ H04B 7/10; H04B 7/0417
See application file for complete search history.

(56) References Cited

U.S. PATENT DOCUMENTS

2009/0227260 A1* 9/2009 Anreddy .............. H04B 7/0452
455/450
2012/0162008 A1 6/2012 Eom
(Continued)

FOREIGN PATENT DOCUMENTS

CN 102783120 A 11/2012
EP 1494380 B1 6/2011
(Continued)

OTHER PUBLICATIONS

International Search Report and Written Opinion from corresponding International Application No. PCT/EP2019/060959, dated Jul. 10, 2019, 14 pages.
(Continued)

*Primary Examiner* — Sophia Vlahos
(74) *Attorney, Agent, or Firm* — Tucker Ellis LLP

(57) ABSTRACT

Methods (50, 60) are provided for operating first and second network nodes (80, 90) of a wireless network which participate (51, 61) in a multiple input multiple output, MIMO, wireless transmission. The network nodes (80, 90) respectively comprise an antenna array (20, 30, 91) having antenna elements (11, 12) being associated with respective ones of two mutually orthogonal planes of polarization. The respective method (50, 60) comprises: communicating (54, 64), by the first network node (80) and to the second network node (90), a sequence of pilot symbols, each of which is associated with one of a set of mutually distinct states of polarization for transmission of the respective pilot symbol; and communicating (55, 65), by the second network node (90) and to the first network node (80), at least one feedback signal associated with the pilot symbols. The at least one feedback signal is indicative of a set state of polarization. The method (50) for operating the first network node (80)
(Continued)

further comprises: configuring (56) the antenna array (20, 30) according to the set state of polarization.

20 Claims, 7 Drawing Sheets

(56) References Cited

U.S. PATENT DOCUMENTS

| | | | |
|---|---|---|---|
| 2013/0003789 A1 | 1/2013 | Eom | |
| 2015/0188620 A1 | 7/2015 | Ponnuswamy | |
| 2015/0381282 A1 | 12/2015 | Zhang | |
| 2016/0100433 A1* | 4/2016 | Vajapeyam | H04W 56/0095 370/329 |
| 2017/0078013 A1* | 3/2017 | Sanderovich | H04B 7/0469 |
| 2017/0288751 A1 | 10/2017 | Faxer | |
| 2017/0331541 A1 | 11/2017 | Kang | |
| 2020/0007197 A1* | 1/2020 | Kang | H04B 7/10 |

FOREIGN PATENT DOCUMENTS

| | | |
|---|---|---|
| WO | 2014138525 A1 | 9/2014 |
| WO | 2017157450 A1 | 9/2017 |

OTHER PUBLICATIONS

Chinese Office Action from corresponding Chinese Application No. 201980030714.8, dated Jan. 27, 2022, 11 pages.

\* cited by examiner

METHODS AND DEVICES FOR POLARIZATION OPTIMIZATION OF MIMO WIRELESS TRANSMISSION

FIELD OF THE INVENTION

Various embodiments of the invention relate to methods and devices for improved reception in multiple input multiple output, MIMO, wireless transmission.

BACKGROUND OF THE INVENTION

Antenna array arrangements for MIMO wireless transmission associated with spectrum bands in a millimeter wave range, e.g. above 6 GHz, are typically composed of several antenna elements.

For instance, in the known implementation illustrated in FIG. 1, each antenna element typically radiates equal signals in the two mutually orthogonal planes of polarizations.

In practical scenarios, this can be suboptimal, except for ideal but hypothetical cases. At a receive side, these signals may be degraded since a channel and other propagation aspects, such as multipath propagation, misalignments between the involved communication devices, etc., may rotate polarization.

BRIEF SUMMARY OF THE INVENTION

Accordingly, there is a need in the art for improving reception in MIMO wireless transmission.

This underlying object of the invention is respectively solved by methods and devices as defined by the independent claims. Preferred embodiments of the invention are set forth in the dependent claims.

According to a first aspect, a method of operating a first network node is provided. The method comprises: participating in a multiple input multiple output, MIMO, wireless transmission between the first network node and a second network node of a wireless network, the first network node comprising an antenna array having antenna elements being associated with respective ones of two mutually orthogonal planes of polarization; transmitting, to the second network node, a sequence of pilot symbols, each pilot symbol being associated with one of a set of mutually distinct states of polarization for transmission of the respective pilot symbol; receiving, from the second network node, at least one feedback signal associated with the pilot symbols, the at least one feedback signal being indicative of a set state of polarization; and configuring the antenna array according to the set state of polarization.

Advantageously, the method improves reception in the MIMO wireless transmission outlined above, in that the transmitting first network node is configured based on feedback by the receiving second network node, which feedback indicates a set state of polarization for transmission by the first network node. This set state of polarization has been observed or is being predicted to optimize reception by the receiving second network node.

The term "multiple input multiple output" or "MIMO" as used herein may refer to exploiting multipath propagation between multiple transmit and receive antennas in radio transmission.

MIMO wireless transmission may be used to increase transmission capacity, by dividing data into separate streams being transmitted simultaneously over the same air interface. When the individual streams are assigned to different network nodes, this is called Multi-User MIMO, MU-MIMO. When the individual streams are assigned to a single network node, this is called Single-User MIMO, SU-MIMO, and may refer to exploiting multipath propagation in a single link between a transmit phased antenna array and a receive phased antenna array to multiply transmission capacity.

The terms "antenna array" or "phased antenna array" as used herein may refer to an antenna array whose antennas transmit or receive a plurality of radio waves having relative amplitudes and phases such that a pattern of constructive and destructive interference forms a directional wavefront, i.e., a beam having a particular direction of propagation, without moving the antennas. Sometimes, antenna arrays are also referred to as antenna panels.

The term "polarization" as used herein may refer to a property of a propagating electromagnetic wave, whose associated electric field components have transversal (or perpendicular) oscillation directions with respect to a propagation direction of the wave.

A "state of polarization" as used herein may refer to the directions of two specific transversal (or perpendicular) sinusoidal oscillation components of a propagating electromagnetic wave with respect to a propagation direction of the wave, and their relative phase difference.

A "set state of polarization" may refer to a particular state of polarization being selected from the set of mutually distinct states of polarization, or being determined as a result of transmissions based on the set of mutually distinct states of polarization. The set state of polarization can indicate a target state of polarization to be implemented at the first network node.

A "plane of polarization" as used herein may refer to a reference plane extending through, and partially being defined by, a straight line defined by a propagation direction of a propagating electromagnetic wave, a relative tilt of such a reference plane with regard to a state of polarization of the wave defining an energy content of the wave with respect to the reference plane. For example, an antenna array having antenna elements being associated with respective ones of two mutually orthogonal planes of polarization has two such mutually orthogonal reference planes. If a propagating electromagnetic wave is incident on such an antenna array, the wave's energy is divided in energy shares associated with these two mutually orthogonal reference planes, according to respective projections of the state of polarization of the wave onto these two reference planes.

A "sequence" as used herein may refer to a series or succession of one or more similar items.

"Pilot symbols" as used herein may refer to particular realizations of reference signals in wireless transmissions which are transmitted in support of the respective transmission. For example, 3GPP standardization of 5G New Radio, NR, defines reference signals that are particularly being used for channel estimation or oscillator phase noise compensation, such as a demodulation reference signal, DMRS, a phase-tracking reference signal, PTRS, a sounding reference signal, SRS and a channel-state information reference signal, CSI-RS.

The method may further comprise transmitting, to the second network node, a signal indicative of a capability of the first network node of tuning a transmit phase shift between the two mutually orthogonal planes of polarization of the antenna array.

Advantageously, such an indication may prompt the second network node to provide explicit feedback as regards a possible configuration of the tunable phase shifting functionality of the first network node, in order to improve reception by the second network node.

Alternatively or additionally, the method may further comprise transmitting, to the second network node, a signal indicative of a capability of the first network node of tuning respective transmit powers of the two mutually orthogonal planes of polarization of the antenna array.

Advantageously, such an indication may prompt the second network node to provide explicit feedback as regards a possible configuration of the tunable power amplification functionality of the first network node, in order to improve reception by the second network node even more.

The set of mutually distinct states of polarization may comprise two orthogonal states of polarization.

Advantageously, such a small set of mutually distinct states of polarization requires a short sequence of two pilot symbols only. A multiple thereof may, however, be transmitted for improved signal-to-noise ratio, SNR.

Receiving the at least one feedback signal indicative of the set state of polarization may comprise receiving data indicative of a matrix of coupling coefficients, each coupling coefficient being indicative of a respective power coupling from one of the two mutually orthogonal planes of polarization of the antenna array of the first network node to one of the two mutually orthogonal planes of polarization of the antenna array of the second network node; and configuring the antenna array according to the set state of polarization may comprise determining the set state of polarization in accordance with a singular vector of the received matrix.

Advantageously, such a direct feedback of a matrix of coupling coefficients, which is also known as polarization transfer matrix, provides the first network node with an overall view of power coupling between the two mutually orthogonal planes of polarization of the respective antenna arrays of the first network node and the second network node. Based on this overall view, the first network node may determine the set state of polarization for transmission which optimizes reception by the second network node. In particular, a singular vector of the received matrix corresponding to the singular value having a largest magnitude will maximize a received energy at the second network node.

Advantageously, functional complexity at the first network node is reduced, since the matrix of coupling coefficients is being populated at the second network node.

Alternatively or additionally, receiving the at least one feedback signal indicative of the set state of polarization may comprise receiving data indicative of a singular vector of a matrix of coupling coefficients, each coupling coefficient being indicative of a respective power coupling from one of the two mutually orthogonal planes of polarization of the antenna array of the first network node to one of the two mutually orthogonal planes of polarization of the antenna array of the second network node; and configuring the antenna array according to the set state of polarization may comprise determining the set state of polarization in accordance with the received singular vector.

Advantageously, such a direct feedback of a singular vector readily provides the first network node with the set state of polarization for transmission that optimizes reception by the second network node. In addition, the matrix of coupling coefficients is being populated at the second network node. Accordingly, functional complexity at the first network node is reduced.

Advantageously, signaling traffic is reduced, since a singular vector is provided as a feedback instead of a matrix of coupling coefficients.

A "singular vector" and a "singular value" as used herein may refer to the outcome of a singular value decomposition, SVD, of a given matrix, in particular of a given polarization transfer matrix.

Alternatively, receiving the at least one feedback signal indicative of the set state of polarization may comprise receiving data at a respective throughput rate resulting from the transmission of the respective pilot symbols; and configuring the antenna array according to the set state of polarization comprises determining the set state of polarization such that a throughput rate of data received by the first network node from the second network node is maximized.

A "throughput rate" as used herein may refer to a rate of successful data transmission over a communication channel, usually being measured in bits per second (bit/s or bps).

Advantageously, such an indirect feedback eliminates signaling by the second network node to the first network node completely. As the transmitted pilot symbols are received at the second network node, the resulting receive powers at the antenna array of the second network node influence a channel state information, CSI, acquisition and a precoding by the second network node, and thus ultimately a transmission rate and a throughput of data sent by the second network node to the first network node. Accordingly, the first network node may observe different throughput rates resulting from transmission of pilot symbols at different states of polarization. Based on this overall view, the first network node may determine the set state of polarization for transmission which optimizes reception by the second network node.

Alternatively, receiving the at least one feedback signal indicative of the set state of polarization may comprise receiving respective receive powers of the transmitted pilot symbols; and configuring the antenna array according to the set state of polarization comprises determining the set state of polarization such that the respective receive powers of the transmitted pilot symbols at the second network node are maximized.

Advantageously, such a direct feedback reduces functional complexity at the second network node. As the transmitted pilot symbols are received at the second network node, the resulting receive powers at the antenna array of the second network node are left unprocessed and simply returned to the first network node. Accordingly, the first network node may observe different receive powers of the second network node resulting from transmission of pilot symbols at different states of polarization. Based on this overall view, the first network node may determine the set state of polarization for transmission which optimizes reception by the second network node.

According to a second aspect, a method of operating a second network node is provided. The method comprises: participating in a multiple input multiple output, MIMO, wireless transmission between a first network node and the second network node of a wireless network; the second network node comprising an antenna array having antenna elements being associated with respective ones of two mutually orthogonal planes of polarization; receiving, from the first network node, a sequence of pilot symbols, each pilot symbol being associated with one of a set of mutually distinct states of polarization for transmission of the respective pilot symbol; and based on a receive property of the pilot symbols: transmitting, to the first network node, at least one feedback signal associated with the pilot symbols, the at least one feedback signal being indicative of a set state of polarization for configuring an antenna array of the first network node accordingly.

Advantageously, the technical effects and advantages described above in relation with the method of operating a first network node equally apply to the interrelated method of operating a second network node having substantially corresponding features.

Transmitting the at least one feedback signal indicative of the set state of polarization may comprise determining the set state of polarization such that respective receive powers of the pilot symbols at the antenna array are maximized.

Transmitting the at least one feedback signal indicative of the set state of polarization may comprise determining the set state of polarization based on at least one of a receive amplitude and a receive phase of the pilot symbols.

The method may further comprise receiving, from the first network node, a signal indicative of a capability of the first network node of tuning a transmit phase shift between the two mutually orthogonal planes of polarization of the antenna array of the first network node.

Alternatively or additionally, the method may further comprise receiving, from the first network node, a signal indicative of a capability of the first network node of tuning respective transmit powers of the two mutually orthogonal planes of polarization of the antenna array of the first network node.

In some embodiments, the set of mutually distinct states of polarization may comprise two orthogonal states of polarization.

Transmitting the at least one feedback signal indicative of the set state of polarization may comprise determining a matrix of coupling coefficients based on a receive property of the pilot symbols, each coupling coefficient being indicative of a respective power coupling from one of the two mutually orthogonal planes of polarization of the antenna array of the first network node to one of the two mutually orthogonal planes of polarization of the antenna array of the second network node.

Transmitting the at least one feedback signal indicative of the set state of polarization may comprise transmitting data indicative of the matrix of coupling coefficients.

Alternatively or additionally, transmitting the at least one feedback signal indicative of the set state of polarization may comprise transmitting data indicative of a singular vector of the matrix of coupling coefficients.

Alternatively, transmitting the at least one feedback signal indicative of the set state of polarization may comprise transmitting data at a respective throughput rate resulting from respective receive powers of the pilot symbols at the antenna array.

Alternatively, transmitting the at least one feedback signal indicative of the set state of polarization comprises transmitting the respective receive powers of the received pilot symbols.

According to a third aspect, a first network node is provided. The first network node comprises: an antenna array having antenna elements being associated with respective ones of two mutually orthogonal planes of polarization; and a processor arranged for participating in a multiple input multiple output, MIMO, wireless transmission between the first network node and a second network node of a wireless network; transmitting, to the second network node, a sequence of pilot symbols, each pilot symbol being associated with one of a set of mutually distinct states of polarization for transmission of the respective pilot symbol; receiving, from the second network node, at least one feedback signal associated with the pilot symbols, the at least one feedback signal being indicative of a set state of polarization; and configuring the antenna array according to the set state of polarization.

The first network node may be configured to perform the method of operating a first network node according to various embodiments.

Advantageously, the technical effects and advantages described above in relation with the method of operating a first network node equally applies to the first network node having corresponding features.

The first network node may further comprise tunable phase shifting means for tuning a transmit phase shift between the two mutually orthogonal planes of polarization of the antenna array.

Advantageously, tunable phase shifters may be used to improve a configuration of the antenna array of the first network node, and in turn a reception by the second network node. In particular, tunable phase shifters may be used to adjust an angle of a state of polarization of transmitted symbols such that this angle approximates or matches an angle of the singular vector of the polarization transfer matrix corresponding to the singular value having the largest magnitude.

The first network node may further comprise tunable amplification means for tuning respective transmit powers of the two mutually orthogonal planes of polarization of the antenna array.

Advantageously, tunable power amplifiers may be used to improve a configuration of the antenna array of the first network node, and in turn a reception by the second network node even more. In particular, tunable power amplifiers may be used to adjust a magnitude of a state of polarization of transmitted symbols such that this magnitude approximates or matches a magnitude of the elements of the singular vector of the polarization transfer matrix corresponding to the singular value having the largest magnitude.

According to a fourth aspect, a second network node is provided. The second network node comprises: an antenna array having antenna elements being associated with respective ones of two mutually orthogonal planes of polarization; and a processor arranged for participating in a multiple input multiple output, MIMO, wireless transmission between a first network node and the second network node of a wireless network; receiving, from the first network node, a sequence of pilot symbols, each pilot symbol being associated with one of a set of mutually distinct states of polarization for transmission of the respective pilot symbol; and transmitting, to the first network node, at least one feedback signal associated with the pilot symbols, the at least one feedback signal being indicative of a set state of polarization for configuring the antenna array of the first network node accordingly.

The second network node may be configured to perform the method of operating a second network node according to various embodiments.

Advantageously, the technical effects and advantages described above in relation with the first network node equally apply to the interrelated second network node having substantially corresponding features.

According to a fifth aspect, a system is provided. The system comprises: a user equipment, UE, of a wireless mobile network comprising a first network node according to various embodiments; and a base station, BS, of a wireless mobile network comprising a second network node according to various embodiments.

According to a sixth aspect, a system is provided. The system comprises: a user equipment, UE, of a wireless mobile network comprising a second network node according to various embodiments; and a base station, BS, of a wireless mobile network comprising a first network node according to various embodiments.

Advantageously, the technical effects and advantages described above in relation with the interrelated first and second network nodes equally apply to systems incorporating these network nodes.

Advantageously, a UE incorporating a first network node and a BS incorporating a second network node enables improving a configuration of the antenna array of the UE in order to improve reception by the BS in uplink transmission.

Advantageously, a BS incorporating a first network node and a UE incorporating a second network node enables improving a configuration of the antenna array of the BS in order to improve reception by the UE in downlink transmission.

BRIEF DESCRIPTION OF THE DRAWINGS

Embodiments of the invention will be described with reference to the accompanying drawings, in which the same or similar reference numerals designate the same or similar elements.

DETAILED DESCRIPTION OF EMBODIMENTS

Figure 1:
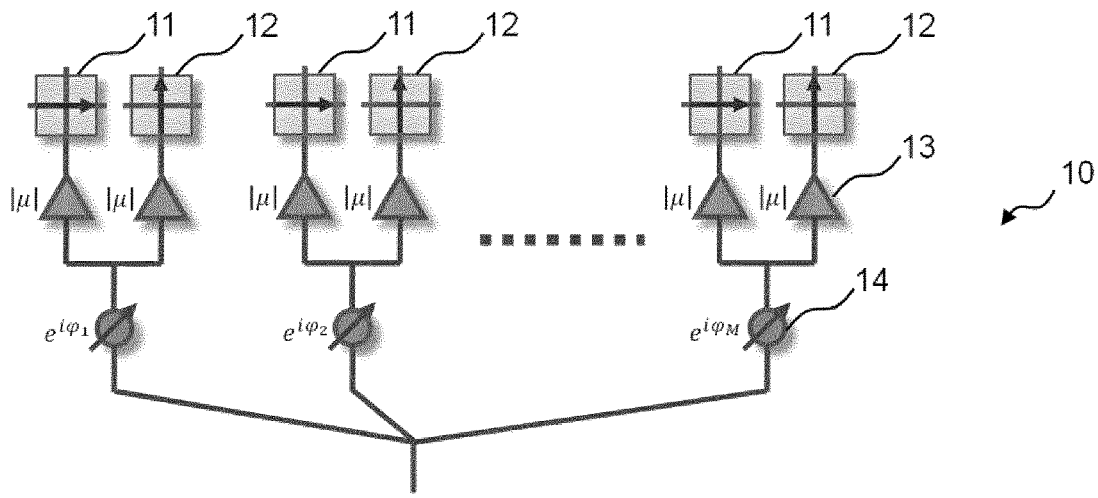
FIG. 1 illustrates an antenna array arrangement 10 for analog beamforming according to prior art.

Exemplary embodiments of the invention will now be described with reference to the drawings. While some embodiments will be described in the context of specific fields of application, the embodiments are not limited to this field of application. Further, the features of the various embodiments may be combined with each other unless specifically stated otherwise.

The drawings are to be regarded as being schematic representations and elements illustrated in the drawings are not necessarily shown to scale. Rather, the various elements are represented such that their function and general purpose become apparent to a person skilled in the art.

Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wireless communication in a network are disclosed. For example, the network may be a cellular network including multiple cells, wherein each cell is defined by one or more Base Stations, BS. Example network architectures include the 3GPP Long Term Evolution, LTE, architecture. According to 3GPP LTE, a wireless channel is defined according to the evolved UMTS Terrestrial Radio Access, EUTRAN. Similar techniques can be readily applied to various kinds of 3GPP-specified architectures, such as Global Systems for Mobile Communications, GSM, Wideband Code Division Multiplex, WCDMA, General Packet Radio Service, GPRS, Enhanced Data Rates for GSM Evolution, EDGE, Enhanced GPRS, EGPRS, Universal Mobile Telecommunications System, UMTS, High Speed Packet Access, HSPA, and corresponding architectures of associated cellular networks. In particular, such techniques may be applied in 3GPP Narrowband Internet of Things, NB-IoT, or enhanced Machine-type Communications, eMTC, networks and 3GPP New Radio, NR, networks. Furthermore, respective techniques may be readily applied to various kinds of non-3GPP-specified architectures, such as Bluetooth, satellite communication, IEEE 802.11x Wi-Fi technology, etc.

FIG. 1 illustrates an antenna array arrangement 10 for analog beamforming according to prior art.

The transmit arrangement 10 comprises an antenna array 11, 12 including horizontally polarized antenna elements 11 as well as vertically polarized antenna elements 12 organized in pairs of horizontally and vertically polarized antenna elements 11, 12. Each antenna element 11, 12 is being fed by a dedicated power amplifier 13 providing a same factor $|\mu|$ of amplification, and each pair of antenna elements 11, 12 is subject to a phase shift introduced by tunable phase shifters 14 for beamforming. The illustrated antenna array arrangement 10 is fed with a radio frequency, RF, signal that is equally divided among the pairs of antenna elements 11, 12.

Figure 2:
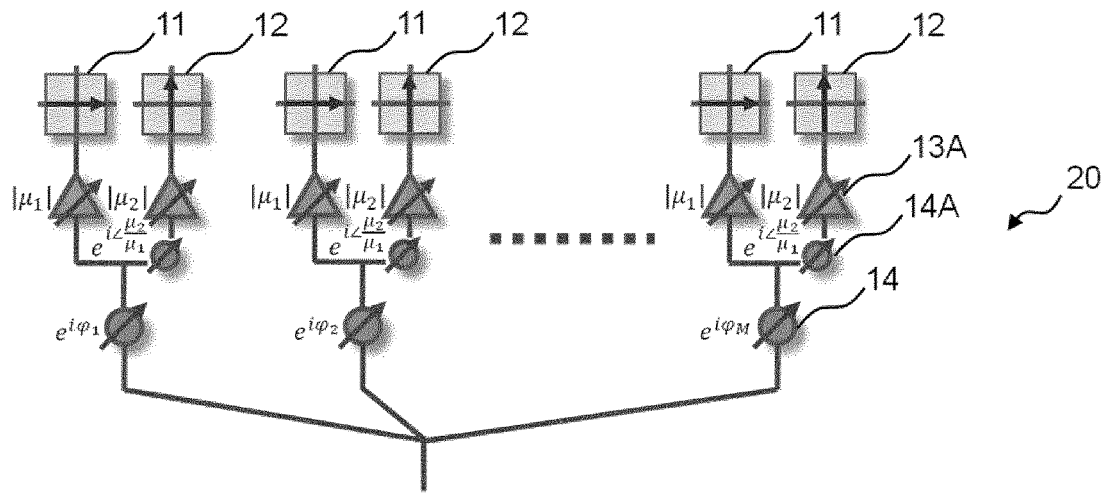
FIGS. 2-4 illustrate antenna array arrangements 20, 30 for analog beamforming according to methods 50, 60 of various embodiments, and analog beamforming based on these antenna array arrangements 20, 30.
Figure 3:
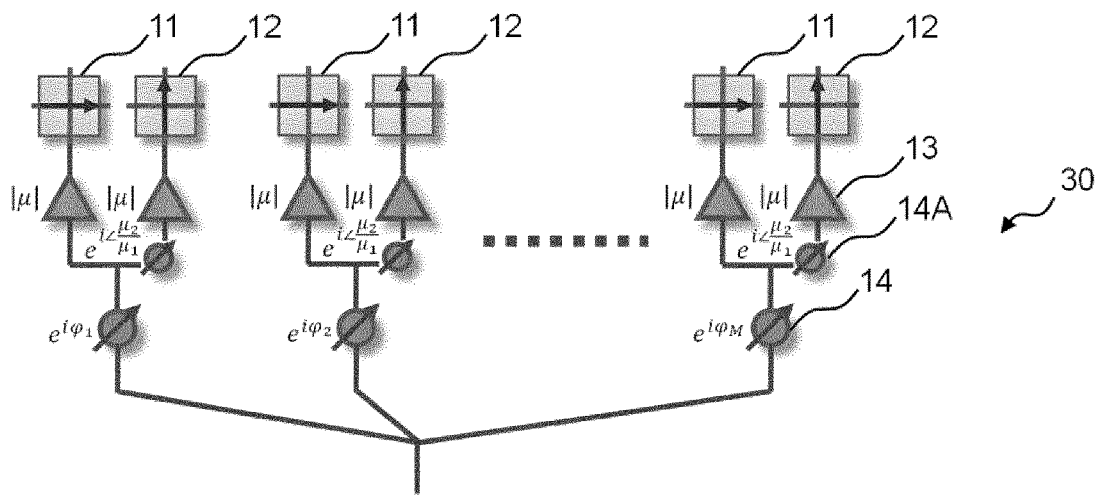
Figure 4:
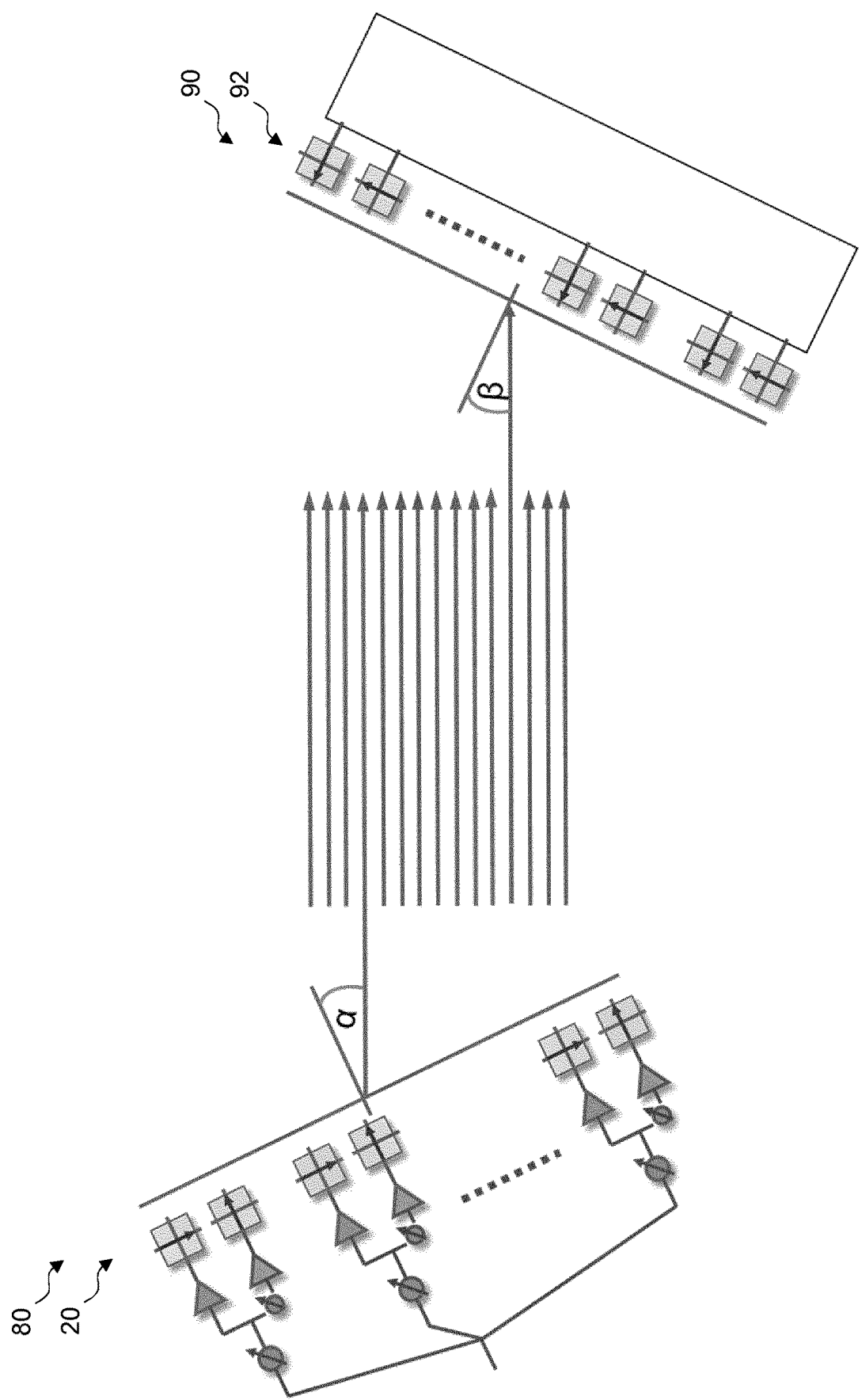

FIGS. 2-4 illustrate antenna array arrangements 20, 30 for analog beamforming according to methods 50, 60 of various embodiments, and analog beamforming based on these antenna array arrangements 20, 30.

The transmit arrangement 20 of FIG. 2 further comprises, with respect to the antenna array arrangement 10 of FIG. 1, tunable power amplifiers 13A for tuning respective transmit powers of the two mutually orthogonal planes of polarization of the antenna array 20, and additional tunable phase shifters 14A for tuning a transmit phase shift between the two mutually orthogonal planes of polarization of the antenna array 20. In the example of FIG. 2, the respective tunable phase shifter 14A is arranged in a signal path of a respective vertically polarized antenna element 12 between the corresponding tunable power amplifier 13A and the corresponding tunable phase shifter 14 for beamforming. Alternatively, the respective tunable phase shifter 14A may also be arranged in a signal path of a respective horizontally polarized antenna element 11.

By contrast, the transmit arrangement 30 of FIG. 3 deploys the fixed power amplifiers 13 of the transmit arrangement 10 of FIG. 1 and the additional tunable phase shifters 14A of the transmit arrangement 20 of FIG. 2. In other terms, the antenna array arrangement 30 of FIG. 3 is a less complex variant of the antenna array arrangement 20 of FIG. 2, and is therefore capable of tuning a transmit phase shift between the two mutually orthogonal planes of polarization of the antenna array 30, but not capable of tuning respective transmit powers of the two mutually orthogonal planes of polarization of the antenna array 30.

FIG. 4 illustrates analog beamforming based on either of the above-mentioned antenna array arrangements 20, 30. It shows a MIMO wireless transmission between a first network node 80 comprising the transmit antenna array arrangement 20, 30 and a second network node 90 comprising a receive antenna array arrangement 92, which transmission is, for clarity reasons, illustrated as a line-of-sight, LOS, transmission. The transmit arrangement 20, 30 is configured for beamforming based on phase shifting, which forms a directional wavefront, i.e., a beam having a particular direction of propagation and a corresponding angle of departure, AoD, α with respect to the antenna array arrangement 20, 30. Based on a far-field assumption, the directed beam is incident on the receive arrangement 92 under an angel of arrival, AoA, β with respect to the antenna array arrangement 92.

A channel matrix of the MIMO wireless transmission may be specified as:

$$H = \gamma s(\beta) s^T(\alpha)$$

where H: channel matrix
γ: channel gain
(.): steering vector

Assuming equal transmit powers of the antenna elements 11, 12 of the transmit antenna array arrangement 20, 30, transmit signals $x_t$ for each of the two mutually orthogonal planes $t \in \{1; 2\}$ of polarization of the transmit antenna array 20, 30 at the first network node 80 are given by:

$$x_t = [e^{i\varphi 1} \ldots e^{i\varphi M}]^T \text{ for } t \in \{1; 2\}$$

Taking into account signal propagation according to the above-mentioned channel matrix, a signal power transfer among the two mutually orthogonal planes of polarization of the transmit antenna array 20, 30 and the receive antenna array 92 as well as a signal power scaling, receive signals $y_r$ for each of the two mutually orthogonal planes $r \in \{1; 2\}$ of polarization of the receive antenna array 92 at the second network node 90 are noted as:

$$y_1 = A_{11}\mu_1 H x_1 + A_{12}\mu_2 H x_2$$

$$y_2 = A_{21}\mu_1 H x_1 + A_{22}\mu_2 H x_2$$

or, in matrix notation, $$y = A\mu H x$$

where y: total received signal at the second network node 90
A: Polarization transfer matrix
μ: Polarization scaling vector The polarization transfer matrix A and the polarization scaling vector μ may respectively be populated by transmitting (pilot) signals according to a first plane of polarization and studying receive (pilot) signals in the same as well as in the other plane of polarization, and repeating this consideration for the second plane of polarization. The matrix A is slowly changing since it is not subject to small-scale fading.

In realistic cases, matrix A is not unitary, and receive signals $y_r$ may be very small, implying potentially unfavorable receive characteristics. A receive energy $\|y_1\|^2 + \|y_2\|^2$ at the second network node 90 may be maximized by appropriate power scaling at the first network node 80, as reflected by the polarization scaling vector μ. In particular, a largest singular value $\lambda_{max}$ (i.e., the singular value having a largest magnitude) of the matrix A will maximize the receive energy at the second network node 90:

$$\lambda_{max} \mu 32 \ A\mu$$

Power scaling may, for example, be implemented using the antenna array arrangement 20 as illustrated in FIG. 2 based on tunable power amplifiers 13A. However, without the tunable power amplifiers 13A, a significantly simpler implementation such as the antenna array arrangement 30 as illustrated in FIG. 3 is obtained.

Figures 6A, 6B:
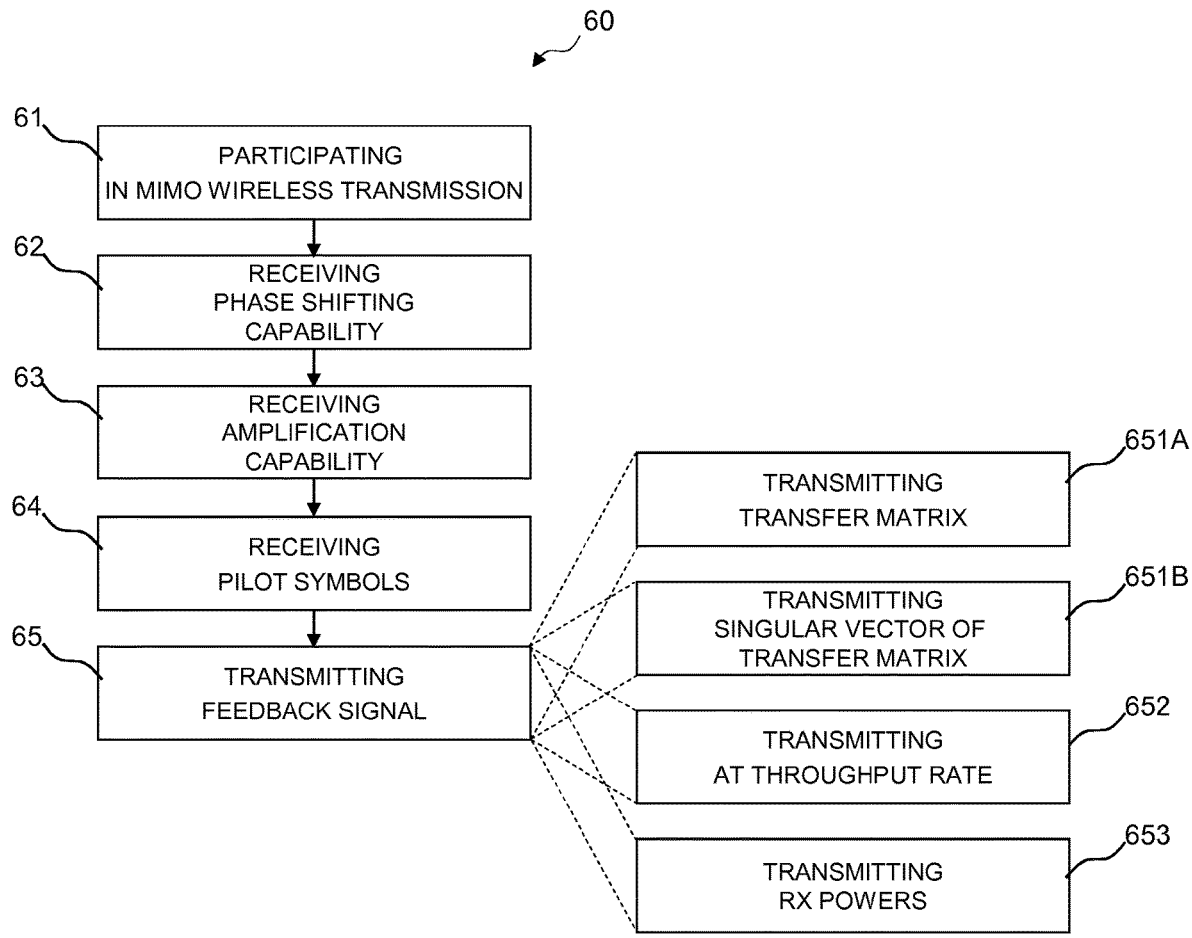
Figure 7:
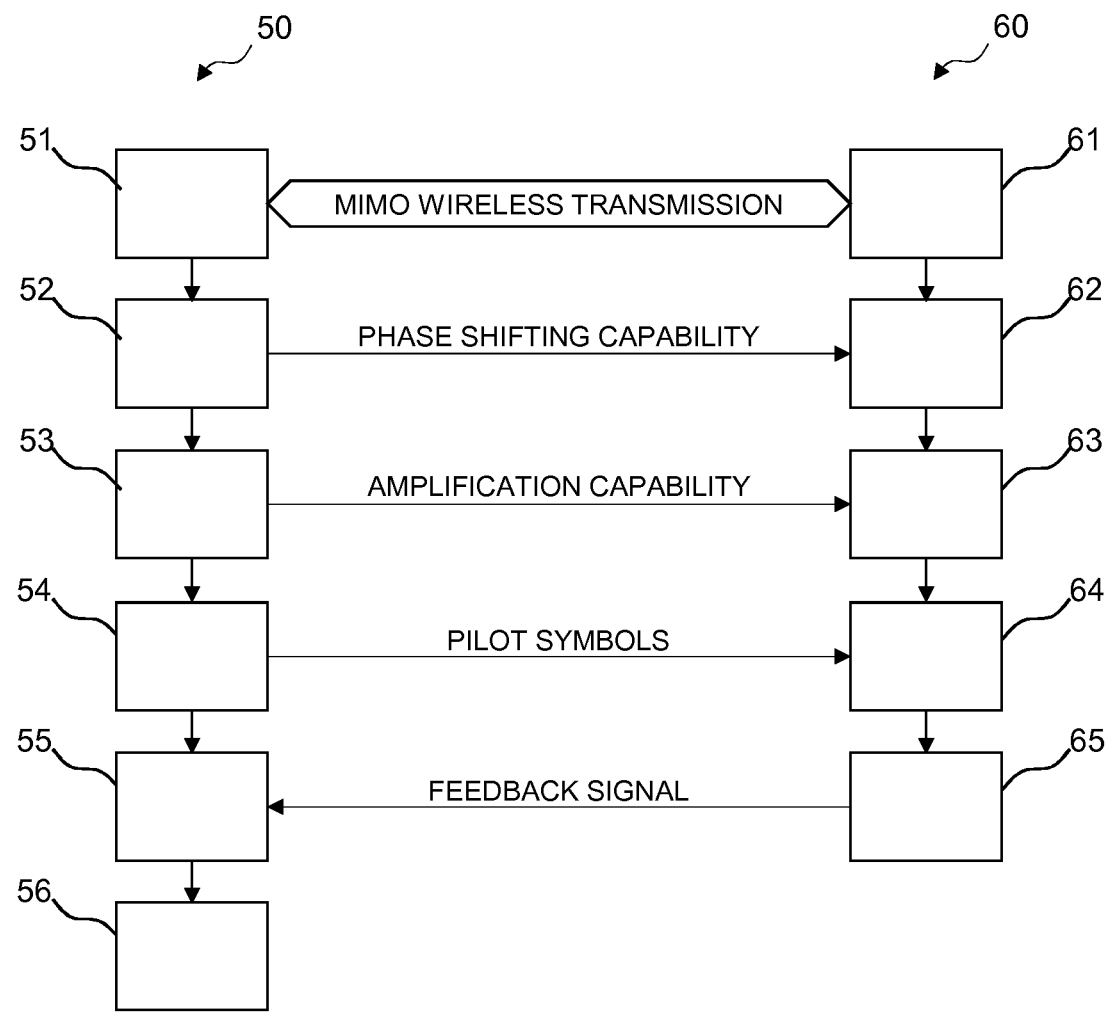

FIGS. 5-7 illustrate methods 50, 60 of operating first and second network nodes 80, 90 according to various embodiments.

The methods 50, 60 implement a communication protocol involving a first network node 80 and a second network node 90 as protocol peers. The first network node 80 performs the method 50 of operating a first network node being illustrated in FIGS. 5A-5B, and the second network node 90 carries out the method 60 of operating a second network node 90 being illustrated in FIGS. 6A-6B. Protocol interaction of the two methods 50, 60 is highlighted in FIG. 7.

Figures 5A, 5B:
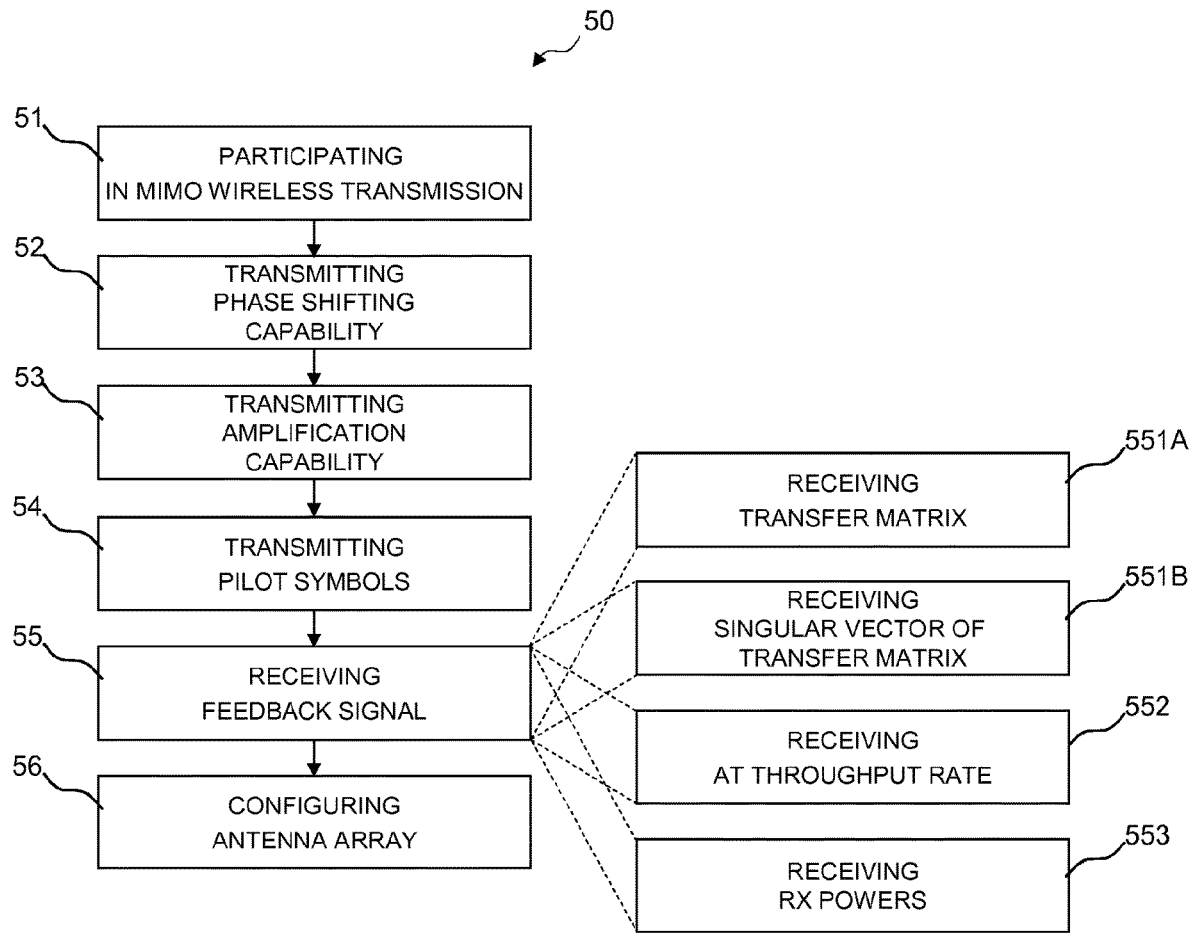
FIGS. 5-7 illustrate methods 50, 60 of operating first and second network nodes 80, 90 according to various embodiments.

FIGS. 5A and 5B illustrate the method 50 of operating a first network node 80. The method at least comprises participating 51, transmitting 54, receiving 55, and configuring 56 steps.

According to FIG. 5A, the method 50 comprises the first network node 80 participating 51 in a multiple input multiple output, MIMO, wireless transmission between the first network node 80 and a second network node 90 of a wireless network. The first network node 80 comprises an antenna array 20, 30 having antenna elements 11, 12 being associated with respective ones of two mutually orthogonal planes of polarization.

According to FIG. 5A, the method 50 further comprises the first network node 80 transmitting 54, to the second network node 90, a sequence of pilot symbols, each pilot symbol being associated with one of a set of mutually distinct states of polarization for transmission of the respective pilot symbol;

According to FIG. 5A, the method 50 further comprises the first network node 80 receiving 55, from the second network node 90, at least one feedback signal associated with the pilot symbols, the at least one feedback signal being indicative of a set state of polarization; and According to FIG. 5A, the method 50 further comprises the first network node 80 configuring 56 the antenna array according to the set state of polarization.

According to FIG. 5A, the method 50 may further comprise the first network node 80 transmitting 52, to the second network node 90, a signal indicative of a capability of the first network node 80 of tuning a transmit phase shift between the two mutually orthogonal planes of polarization of the antenna array. In particular, this capability coincides with an availability of tunable phase shifters 14A as shown in FIGS. 2-3 for tuning a transmit phase shift between the two mutually orthogonal planes of polarization of a transmit antenna array arrangement 20, 30 of the first network node 80.

According to FIG. 5A, the method 50 may further comprise the first network node 80 transmitting 53, to the second network node 90, a signal indicative of a capability of the first network node 80 of tuning respective transmit powers of the two mutually orthogonal planes of polarization of the antenna array. In particular, this capability coincides with an availability of tunable power amplifiers 13A as shown in FIG. 2 for tuning respective transmit powers of the two mutually orthogonal planes of polarization of a transmit antenna array arrangement 20, 30 of the first network node 80.

In a first protocol embodiment, the set of mutually distinct states of polarization may comprise two orthogonal states of polarization and as many associated pilot symbols.

According to FIG. 5B, the first protocol embodiment may involve that receiving 55 the at least one feedback signal indicative of the set state of polarization may comprise receiving 551A data indicative of a matrix of coupling coefficients. Each coupling coefficient is indicative of a respective power coupling from one of the two mutually orthogonal planes of polarization of the antenna array 20, 30 of the first network node 80 to one of the two mutually orthogonal planes of polarization of the antenna array 92 of the second network node 90. Further, configuring 56 the antenna array 20, 30 according to the set state of polarization may comprise determining the set state of polarization in accordance with a singular vector of the received matrix.

According to FIG. 5B, the first protocol embodiment may alternatively or additionally involve that receiving 55 the at least one feedback signal indicative of the set state of polarization may comprise receiving 551B data indicative of a singular vector of a matrix of coupling coefficients, and configuring 56 the antenna array 20, 30 according to the set state of polarization may comprise determining the set state of polarization in accordance with the received singular vector.

In second and third protocol embodiments, the set of mutually distinct states of polarization may comprise two or more states of polarization and as many associated pilot symbols.

According to FIG. 5B, the second protocol embodiment may involve that receiving 55 the at least one feedback signal indicative of the set state of polarization may comprise receiving 552 data at a respective throughput rate resulting from the transmission of the respective pilot symbols; and configuring 56 the antenna array according to the set state of polarization may comprise determining the set state of polarization such that a throughput rate of data received by the first network node from the second network node is maximized.

According to FIG. 5B, the third protocol embodiment may involve that receiving 55 the at least one feedback signal indicative of the set state of polarization may comprise receiving 553 respective receive powers of the transmitted pilot symbols; and configuring 56 the antenna array according to the set state of polarization may comprise determining the set state of polarization such that the respective receive powers of the transmitted pilot symbols at the second network node are maximized.

FIGS. 6A and 6B illustrate the method 60 of operating a second network node 90. The method at least comprises participating 61, receiving 64, and transmitting 65 steps.

According to FIG. 6A, the method 60 comprises the second network node 90 participating 61 in a multiple input multiple output, MIMO, wireless transmission between a first network node 80 and the second network node 90 of a wireless network. The second network node 90 comprises an antenna array 20, 30 having antenna elements 11, 12 being associated with respective ones of two mutually orthogonal planes of polarization.

According to FIG. 6A, the method 60 further comprises the second network node 90 receiving 64, from the first network node 80, a sequence of pilot symbols, each pilot symbol being associated with one of a set of mutually distinct states of polarization for transmission of the respective pilot symbol.

According to FIG. 6A, the method 60 further comprises the second network node 90, based on a receive property of the pilot symbols, transmitting 65 to the first network node 80 at least one feedback signal associated with the pilot symbols, the at least one feedback signal being indicative of a set state of polarization for configuring an antenna array 20, 30 of the first network node 80 accordingly.

Transmitting 65 the at least one feedback signal indicative of the set state of polarization may comprise determining the set state of polarization such that respective receive powers of the pilot symbols at the antenna array are maximized.

Transmitting 65 the at least one feedback signal indicative of the set state of polarization may alternatively or additionally comprise determining the set state of polarization based on at least one of a receive amplitude and a receive phase of the pilot symbols.

According to FIG. 6A, the method 60 may further comprise the second network node 90 receiving 62, from the first network node 80, a signal indicative of a capability of the first network node 80 of tuning a transmit phase shift between the two mutually orthogonal planes of polarization of the antenna array 20, 30 of the first network node 80. In particular, this capability coincides with an availability of tunable phase shifters 14A as shown in FIGS. 2-3 for tuning a transmit phase shift between the two mutually orthogonal planes of polarization of a transmit antenna array arrangement 20, 30 of the first network node 80.

According to FIG. 6A, the method 60 may further comprise the second network node 90 receiving 63, from the first network node 80, a signal indicative of a capability of the first network node 80 of tuning respective transmit powers of the two mutually orthogonal planes of polarization of the antenna array 20, 30 of the first network node 80. In particular, this capability coincides with an availability of tunable power amplifiers 13A as shown in FIG. 2 for tuning respective transmit powers of the two mutually orthogonal planes of polarization of a transmit antenna array arrangement 20, 30 of the first network node 80.

In a first protocol embodiment, the set of mutually distinct states of polarization comprises two orthogonal states of polarization and as many associated pilot symbols.

The first protocol embodiment may involve that transmitting 65 the at least one feedback signal indicative of the set state of polarization may comprise determining a matrix of coupling coefficients based on a receive property of the pilot symbols. each coupling coefficient being indicative of a respective power coupling from one of the two mutually orthogonal planes of polarization of the antenna array 20, 30 of the first network node 80 to one of the two mutually orthogonal planes of polarization of the antenna array 92 of the second network node 90.

According to FIG. 6B, the first protocol embodiment may involve that transmitting 65 the at least one feedback signal indicative of the set state of polarization may comprise transmitting 651A data indicative of the matrix of coupling coefficients.

According to FIG. 6B, the first protocol embodiment may alternatively or additionally involve that transmitting 65 the at least one feedback signal indicative of the set state of polarization may comprise transmitting 651B data indicative of a singular vector of the matrix of coupling coefficients.

In second and third protocol embodiments, the set of mutually distinct states of polarization may comprise two or more states of polarization and as many associated pilot symbols.

According to FIG. 6B, the second protocol embodiment may involve that transmitting 65 the at least one feedback signal indicative of the set state of polarization may comprise transmitting 652 data at a respective throughput rate resulting from respective receive powers of the pilot symbols at the antenna array.

According to FIG. 5B, the third protocol embodiment may involve that transmitting 65 the at least one feedback signal indicative of the set state of polarization may comprise transmitting 653 the respective receive powers of the received pilot symbols.

FIG. 7 illustrates an interaction of the methods 50, 60 of operating first and second network nodes 80, 90. A left-hand side of FIG. 7 shows the participating 51, transmitting 52-54, receiving 55, and configuring 56 steps of the method 50, while a left-hand side of FIG. 7 depicts the participating 61, receiving 62-64, and transmitting 65 steps of the method 60.

According to FIG. 7, protocol interaction between the methods 50, 60 occurs as follows:
- the participating 51, 61 steps accomplish a MIMO wireless transmission between the first network node 80 and the second network node 90;
- the transmitting 52 and receiving 62 steps accomplish a transfer of a phase shifting capability, i.e., of tuning a transmit phase shift, of the first network node 80 to the second network node 90;
- the transmitting 53 and receiving 63 steps accomplish a transfer of an amplification capability, i.e., of tuning transmit powers, of the first network node 80 to the second network node 90;
- the transmitting 54 and receiving 64 steps accomplish a transfer of a sequence of pilot symbols from the first network node 80 to the second network node 90; and
- the receiving 55 and transmitting 65 steps accomplish a transfer of a feedback signal from the second network node 90 to the first network node 80.

The step of configuring 56 the antenna array according to the set state of polarization does not involve any further protocol interaction.

Figure 8:
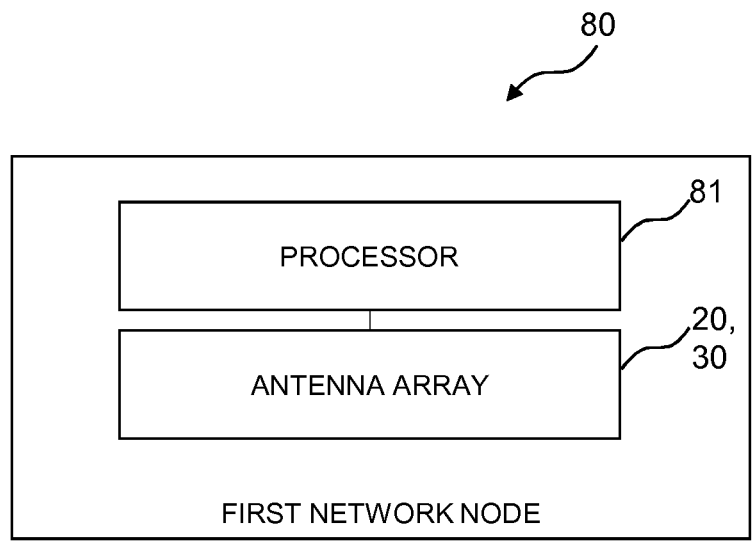
FIGS. 8-9 illustrate first and second network nodes 80, 90 according to various embodiments.
Figure 9:
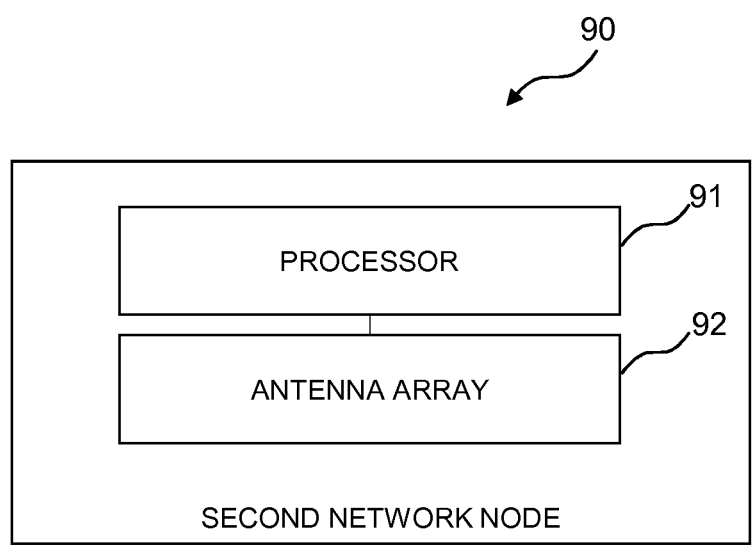

FIGS. 8-9 illustrate first and second network nodes 80, 90 according to various embodiments.

In FIG. 8, a first network node 80 is outlined. The first network node 80 comprises a processor 81 and an antenna array 20, 30 as illustrated in FIGS. 2-3.

The processor 81 is arranged for performing method steps of: participating 51 in a multiple input multiple output, MIMO, wireless transmission between the first network node 80 and a second network node 90 of a wireless network; transmitting 54, to the second network node 90, a sequence of pilot symbols, each pilot symbol being associated with one of a set of mutually distinct states of polarization for transmission of the respective pilot symbol; receiving 55, from the second network node 90, at least one feedback signal associated with the pilot symbols, the at least one feedback signal being indicative of a set state of polarization; and configuring 56 the antenna array 20, 30 according to the set state of polarization. In other terms, the processor 81 of the first network node 80 is configured to perform the method steps 51, 54, 55, and 56 of the method 50 of operating the first network node 80 as illustrated in FIG. 5A, for example. In addition, the first network node 80 is configured to perform the method 50 according to various embodiments.

In FIG. 9, a second network node 90 is shown. The second network node 90 comprises a processor 91 similarly to the processor 81 of first network node 80, and an antenna array 92 having antenna elements 11, 12 being associated with respective ones of two mutually orthogonal planes of polarization.

The processor 91 is arranged for performing method steps of: participating 61 in a multiple input multiple output, MIMO, wireless transmission between a first network node 80 and the second network node 90 of a wireless network; receiving 64, from the first network node 80, a sequence of pilot symbols, each pilot symbol being associated with one of a set of mutually distinct states of polarization for transmission of the respective pilot symbol; and transmitting 65, to the first network node 80, at least one feedback signal associated with the pilot symbols, the at least one feedback signal being indicative of a set state of polarization for configuring 56 the antenna array 20, 30 of the first network node 80 accordingly. In other terms, the processor 91 of the second network node 90 is configured to perform the method steps 61, 64, and 65 of the method 60 of operating the second network node 90 as illustrated in FIG. 6A, for example. In addition, the second network node 90 is configured to perform the method 60 according to various embodiments.

Figure 10:
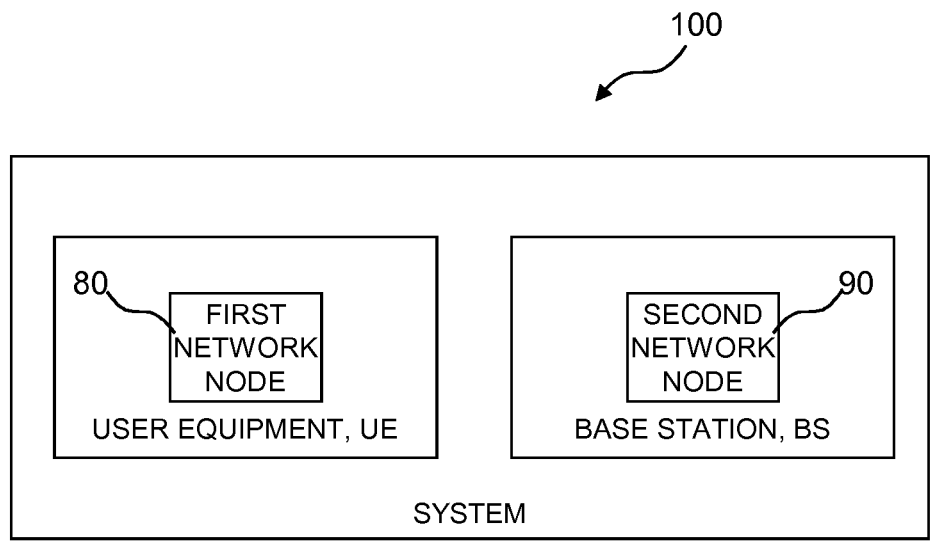
FIGS. 10-11 illustrate systems 100, 110 respectively comprising first and second network nodes 80, 90 according to various embodiments.
Figure 11:
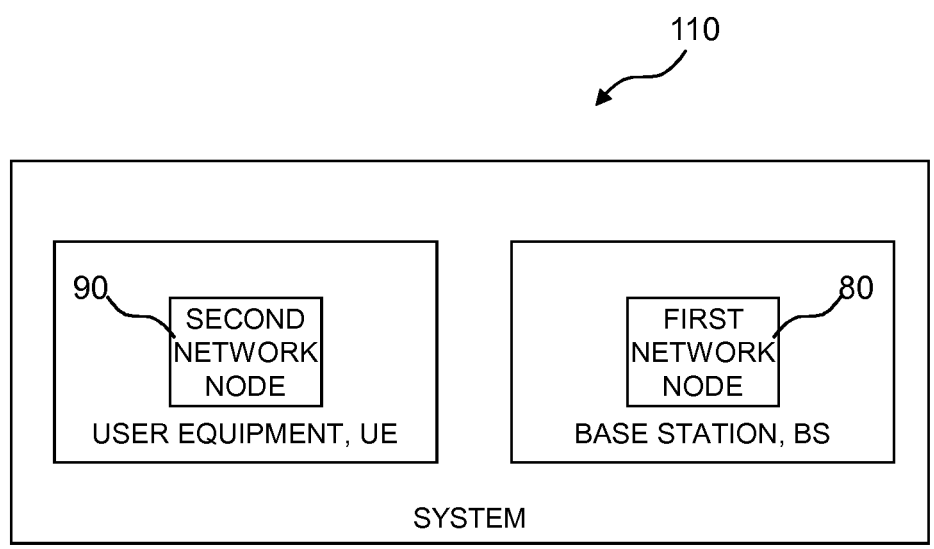

FIGS. 10-11 illustrate systems 100, 110 respectively comprising first and second network nodes 80, 90 according to various embodiments.

In FIG. 10, a system 100 is shown. The system 100 comprises: a user equipment, UE, of a wireless mobile network comprising a first network node 80 according to various embodiments; and a base station, BS, of a wireless mobile network comprising a second network node 90 according to various embodiments. In other terms, the system 100 implements a protocol interaction according to the methods 50, 60 of operating first and second network nodes 80, 90 for configuring a MIMO wireless transmission in an uplink direction.

In FIG. 11, a system 110 comprising a user equipment, UE, and a base station, BS, of a wireless mobile network are illustrated. The UE comprises a second network node 90 according to various embodiments; and the BS comprises a first network node 80 according to various embodiments. In other terms, the system 110 implements a protocol interaction according to the methods 50, 60 of operating first and second network nodes 80, 90 for configuring a MIMO wireless transmission in a downlink direction.

While methods 50, 60, and network nodes 80, 90 according to various embodiments have been described, various modifications may be implemented in other embodiments. For illustration, the method steps 52, 53 and 62, 63 do not necessarily need to be implemented in the order shown in FIGS. 5A, 6A, and 7. For further illustration, the pilot symbols transmitted 54 by the first network node 80 and received 64 by the second network node 90 may be pilot symbols (or reference signals) as specified by applicable industry standards, or new pertinent pilot symbols.

Summarizing, above techniques have been described which enable to tailor the state of polarization used by an antenna array to transmit and/or to receive. A closed-loop control of the polarization may be employed using pilot symbols transmitted in one direction and feedback signals transmitted in the other direction.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above, various scenarios have been described in which uplink pilot symbols are used. Similar techniques may be readily employed for downlink pilot symbols or sidelink pilot symbols transmitted between two UEs.

The invention claimed is:

1. A method of operating a first network node, comprising:
participating in a multiple input multiple output (MIMO) wireless transmission between the first network node and a second network node of a wireless network, the first network node comprising an antenna array having antenna elements being associated with respective ones of two mutually orthogonal planes of polarization;

transmitting, to the second network node, a signal indicative of a capability of the first network node of tuning a transmit phase shift between the two mutually orthogonal planes of polarization of the antenna array;

transmitting, to the second network node, a sequence of pilot symbols, each pilot symbol being associated with one of a set of mutually distinct states of polarization for transmission of the respective pilot symbol;

receiving, from the second network node, at least one feedback signal associated with the pilot symbols, the at least one feedback signal being indicative of a set state of polarization; and configuring the antenna array according to the set state of polarization.

2. A method of operating a first network node, comprising:

participating in a multiple input multiple output (MIMO) wireless transmission between the first network node and a second network node of a wireless network, the first network node comprising an antenna array having antenna elements being associated with respective ones of two mutually orthogonal planes of polarization;

transmitting, to the second network node, a signal indicative of a capability of the first network node of tuning respective transmit powers of the two mutually orthogonal planes of polarization of the antenna array transmitting, to the second network node, a sequence of pilot symbols, each pilot symbol being associated with one of a set of mutually distinct states of polarization for transmission of the respective pilot symbol;

receiving, from the second network node, at least one feedback signal associated with the pilot symbols, the at least one feedback signal being indicative of a set state of polarization; and configuring the antenna array according to the set state of polarization.

3. The method of claim 1, wherein
the set of mutually distinct states of polarization comprises two orthogonal states of polarization.

4. The method of claim 3, wherein
receiving the at least one feedback signal indicative of the set state of polarization comprises receiving data indicative of a matrix of coupling coefficients, each coupling coefficient being indicative of a respective power coupling from one of the two mutually orthogonal planes of polarization of the antenna array of the first network node to one of the two mutually orthogonal planes of polarization of the antenna array of the second network node; and configuring the antenna array according to the set state of polarization comprises determining the set state of polarization in accordance with a singular vector of the received matrix.

5. The method of claim 3, wherein
receiving the at least one feedback signal indicative of the set state of polarization comprises receiving data indicative of a singular vector of a matrix of coupling coefficients, each coupling coefficient being indicative of a respective power coupling from one of the two mutually orthogonal planes of polarization of the antenna array of the first network node to one of the two mutually orthogonal planes of polarization of the antenna array of the second network node; and configuring the antenna array according to the set state of polarization comprises determining the set state of polarization in accordance with the received singular vector.

6. The method of claim 1, wherein
receiving the at least one feedback signal indicative of the set state of polarization comprises receiving data at a respective throughput rate resulting from the transmission of the respective pilot symbols; and configuring the antenna array according to the set state of polarization comprises determining the set state of polarization such that a throughput rate of data received by the first network node from the second network node is maximized.

7. The method of claim 1, wherein
receiving the at least one feedback signal indicative of the set state of polarization comprises receiving respective receive powers of the transmitted pilot symbols; and configuring the antenna array according to the set state of polarization comprises determining the set state of polarization such that the respective receive powers of the transmitted pilot symbols at the second network node are maximized.

8. A method of operating a second network node, comprising:

participating in a multiple input multiple output (MIMO) wireless transmission between a first network node and the second network node of a wireless network; the second network node comprising an antenna array having antenna elements being associated with respective ones of two mutually orthogonal planes of polarization;

receiving, from the first network node, a signal indicative of a capability of the first network node of tuning a transmit phase shift between the two mutually orthogonal planes of polarization of the antenna array of the first network node;

receiving, at the antenna array and from the first network node, a sequence of pilot symbols, each pilot symbol being associated with one of a set of mutually distinct states of polarization for transmission of the respective pilot symbol; and based on a receive property of the pilot symbols: transmitting, to the first network node, at least one feedback signal associated with the pilot symbols, the at least one feedback signal being indicative of a set state of polarization for configuring an antenna array of the first network node.

9. The method of claim 8, wherein
transmitting the at least one feedback signal indicative of the set state of polarization comprises determining the set state of polarization such that respective receive powers of the pilot symbols at the antenna array are maximized.

10. The method of claim 8, wherein
transmitting the at least one feedback signal indicative of the set state of polarization comprises determining the set state of polarization based on at least one of a receive amplitude and a receive phase of the pilot symbols.

11. A method of operating a second network node, comprising:

participating in a multiple input multiple output (MIMO) wireless transmission between a first network node and the second network node of a wireless network; the second network node comprising an antenna array having antenna elements being associated with respective ones of two mutually orthogonal planes of polarization;

receiving, from the first network node, a signal indicative of a capability of the first network node of tuning respective transmit powers of the two mutually orthogonal planes of polarization of the antenna array of the first network node;

receiving, at the antenna array and from the first network node, a sequence of pilot symbols, each pilot symbol being associated with one of a set of mutually distinct states of polarization for transmission of the respective pilot symbol; and based on a receive property of the pilot symbols: transmitting, to the first network node, at least one feedback signal associated with the pilot symbols, the at least one feedback signal being indicative of a set state of polarization for configuring an antenna array of the first network node.

12. The method of claim 8, wherein
the set of mutually distinct states of polarization comprises two orthogonal states of polarization.

13. The method of claim 12, wherein
transmitting the at least one feedback signal indicative of the set state of polarization comprises determining a matrix of coupling coefficients based on a receive property of the pilot symbols, each coupling coefficient being indicative of a respective power coupling from one of the two mutually orthogonal planes of polarization of the antenna array of the first network node to one of the two mutually orthogonal planes of polarization of the antenna array of the second network node.

14. The method of claim 13, wherein
transmitting the at least one feedback signal indicative of the set state of polarization comprises transmitting data indicative of the matrix of coupling coefficients.

15. The method of claim 13, wherein
transmitting the at least one feedback signal indicative of the set state of polarization comprises transmitting data indicative of a singular vector of the matrix of coupling coefficients.

16. The method of claim 8, wherein
transmitting the at least one feedback signal indicative of the set state of polarization comprises transmitting data at a respective throughput rate resulting from respective receive powers of the pilot symbols at the antenna array.

17. The method of claim 8, wherein
transmitting the at least one feedback signal indicative of the set state of polarization comprises transmitting the respective receive powers of the received pilot symbols.

18. A first network node, comprising:
an antenna array having antenna elements being associated with respective ones of two mutually orthogonal planes of polarization; and
a processor arranged for:
  participating in a multiple input multiple output (MIMO) wireless transmission between the first network node and a second network node of a wireless network;
  at least one of: transmitting, to the second network node, a signal indicative of a capability of the first network node of tuning a transmit phase shift between the two mutually orthogonal planes of polarization of the antenna array; or transmitting, to the second network node, a signal indicative of a capability of the first network node of tuning respective transmit powers of the two mutually orthogonal planes of polarization of the antenna array;
  transmitting, to the second network node, a sequence of pilot symbols, each pilot symbol being associated with one of a set of mutually distinct states of polarization for transmission of the respective pilot symbol;
  receiving, from the second network node, at least one feedback signal associated with the pilot symbols, the at least one feedback signal being indicative of a set state of polarization; and
  configuring the antenna array according to the set state of polarization.

19. The first network node of claim 18, further comprising
tunable phase shifting means for tuning a transmit phase shift between the two mutually orthogonal planes of polarization of the antenna array, and
tunable amplification means for tuning respective transmit powers of the two mutually orthogonal planes of polarization of the antenna array.

20. A second network node, comprising:
an antenna array having antenna elements being associated with respective ones of two mutually orthogonal planes of polarization; and
a processor arranged for:
  participating in a multiple input multiple output (MIMO) wireless transmission between a first network node and the second network node of a wireless network;
  at least one of: receiving, from the first network node, a signal indicative of a capability of the first network node of tuning a transmit phase shift between the two mutually orthogonal planes of polarization of the antenna array; or receiving, from the first network node, a signal indicative of a capability of the first network node of tuning respective transmit powers of the two mutually orthogonal planes of polarization of the antenna array;
  receiving, from the first network node, a sequence of pilot symbols, each pilot symbol being associated with one of a set of mutually distinct states of polarization for transmission of the respective pilot symbol; and
  transmitting, to the first network node, at least one feedback signal associated with the pilot symbols, the at least one feedback signal being indicative of a set state of polarization for configuring the antenna array of the first network node.

* * * * *